United States Patent [19] [11] Patent Number: 5,014,923
Robertson [45] Date of Patent: May 14, 1991

[54] WEB-SPOOL FOR A CARTRIDGE

[75] Inventor: Jeffrey C. Robertson, Rochester, N.Y.

[73] Assignee: Eastman Kodak Company, Rochester, N.Y.

[21] Appl. No.: 505,962

[22] Filed: Apr. 9, 1990

[51] Int. Cl.⁵ .......................... B65H 75/22; F16B 1/00
[52] U.S. Cl. ..................................... 242/55; 242/71.8; 242/118.61; 242/116; 403/348
[58] Field of Search ........... 242/55, 71.8, 116, 118.61; 403/348

[56] References Cited

U.S. PATENT DOCUMENTS

| | | | |
|---|---|---|---|
| 3,346,211 | 10/1967 | Gruber | 242/71.8 |
| 3,389,872 | 6/1968 | Lyman | 242/71.8 |
| 3,438,592 | 4/1969 | Posso | 242/71.8 |
| 3,545,696 | 12/1970 | Berkey | 242/71.8 |
| 3,642,223 | 2/1972 | Feichtinger | 242/71.8 |
| 3,724,771 | 4/1973 | Zielke | 242/71.8 X |
| 4,281,895 | 8/1981 | Mohr | 403/348 X |
| 4,296,890 | 10/1981 | Posso | 242/71.8 |
| 4,653,708 | 3/1987 | Rich | 403/348 X |
| 4,726,538 | 2/1988 | Kovacik et al. | 242/71.8 |
| 4,739,945 | 4/1988 | Yokoe | 242/71.8 X |
| 4,756,488 | 7/1988 | Cooke | 242/116 |
| 4,802,633 | 2/1989 | Beery | 242/71.1 |

FOREIGN PATENT DOCUMENTS

| | | | |
|---|---|---|---|
| 1028671 | 11/1950 | France | 242/118.61 |
| 1438195 | 6/1976 | United Kingdom | 403/348 |

Primary Examiner—Daniel P. Stodola
Assistant Examiner—John P. Darling
Attorney, Agent, or Firm—William C. Dixon, III

[57] ABSTRACT

A web-spool for a cartridge comprises a cylindrical core having an outer periphery at each end thereof with at least one core lug and an annular ring extending radially outward from each periphery in axially spaced relation to form a core peripheral groove therebetween at each core end. The annular rings at both core ends have respective inner tapered surfaces that face each other to initially guide a web being wound onto the core, and also to provide clearance between the wound web edges and adjacent core flanges, to thereby accommodate any web telescoping and thus permit the flanges to be readily secured to the core ends without interfering with the web edges. Each flange has an axially inner surface with an annular throat extending axially outward therefrom for receiving the core lug(s) and annular ring. Within the annular throat is at least one radially inwardly extending flange lug with recesses at both sides thereof, the flange lug(s) being adapted to nest within the core peripheral groove and the recesses being adapted to receive the core lug(s), when a core end is inserted into the flange throat and the core and flange are then turned relative to each other. Complementary ratchet teeth are provided on opposed mating surfaces of the core and flange, to permit relative rotation therebetween in one direction for securing the two together, and to prevent relative rotation in the opposite direction and consequent unintended disassembly of those members.

8 Claims, 4 Drawing Sheets

WINDOW COOLING FOR HIGH SPEED FLIGHT

BACKGROUND OF THE INVENTION

This invention relates generally to the cooling of windows placed on high speed flight vehicles.

Certain modifications of flight vehicle surfaces for aerodynamic drag reducing purposes have been proposed and tested, involving in common diversion of boundary layer flow into a surface cavity to establish a passive internal circulating flow for drag reduction purposes. One of such modifications includes the use of a porous cavity partition within a surface recess through which circulating flow is conducted to reduce surface drag by control of internal cavity flow. According to another of such surface modifications, a pivoted drag head mounted flush with the surface is utilized to control circulating flow within the cavity. An important discovery of the present invention resides in the use of certain diverse aspects of the foregoing surface drag reducing techniques to provide for windows cooling in a novel and unexpectedly beneficial manner.

It is therefore an important object of the present invention to provide a method and means for cooling windows in flight vehicle surfaces, otherwise subjected to aerodynamic heating damage, in a less expensive manner and without excessive addition of burdensome weight to the flight vehicle.

SUMMARY OF THE INVENTION

In accordance with the present invention, an internally depressurized cavity is formed within a flight vehicle underlying a surface thereof subjected to aerodynamic heating under high velocity flight, such cavity being closed by a window to be cooled. The portion of the surface peripherally framing the the window is ported to induce a circulating flow of fluid externally along the window in the direction of the boundary layer flow of air along the flight vehicle surface during high speed travel. The internal portion of the circulating flow occurs within the cavity in the opposite or reversed flow direction. Toward that end, the porting includes a downstream slot passage through which a buffering portion of the boundary layer air is diverted into the cavity under ram air pressure and an upstream outflow passage through which internally cooled fluid exits into the boundary layer for mixing therewith. The fluid diverted internally into the cavity is accordingly directed along a flow path isolated by the window from the external boundary layer for cooling by heat exchange within a cavity mounted heat sink device. The mixture of a buffering fluid formed by a portion of the boundary layer and coolant in a recirculative flow path absorbs heat from the windows for cooling thereof below a destructive temperature level.

BRIEF DESCRIPTION OF THE DRAWING FIGURES

Other objects advantages and novel features of the invention will become apparent from the following detailed description of the invention when considered in conjuction with the accompanying drawings wherein:

FIG. 1 is perspective view of a flight vehicle surface component having a recessed window portion.

FIG. 2 is an enlarged partial section view taken substantially through a plane indicated by section line 2—2 in FIG. 1, showing the recessed window portion construction in accordance with one embodiment of the invention.

FIG. 3 is a partial section view showing certain modifications of the arrangement shown in FIG. 2.

DETAILED DESCRIPTION OF THE PREFERRED EMBODIMENT

Referring now to the drawing in detail, FIG. 1 illustrates, by way of example only, an aerodynamic component 10 of some high speed flight vehicle having a relatively rigid surface 12 along which air flows in a direction generally indicated by arrow 14. The aerodynamic surface 12 has a window portion generally referred to by reference numeral 16 through which radiation is received or emitted for various reasons often associated with a vehicle carried detection system, for example. Under supersonic flight conditions, the high speed flow of air in contact with the surface 12 generates intense heat. The material of the window portion 16 is ordinarily unable to tolerate such heat without damage unless adequate cooling is provided.

As shown in FIG. 2, during flight of the vehicle a boundary layer of air 18 forms along the surface 12 traveling relative thereto in the direction of arrows 20. Along the window portion 16 of the surface 12, a cooling zone 22 is formed above a window 24 which requires adequate cooling under the high speed flight conditions. Cooling of the exposed surface of window 24 is accordingly effected in accordance with the present invention for a distance (L) along the cooling zone 22 in the flow direction cf the boundary layer 18, the cooling zone having a depth (H) in the example shown.

The cooling zone to which the window 24 is exposed, as shown in FIG. 2, forms a portion of the boundary layer 18 within which a buffering/cooling action occurs. Such buffering portion of the boundary layer 18 is rendered heat absorbent for cooling purpose by mixing with cooled buffering fluid undergoing flow denoted by arrow 26 in the direction of the boundary layer flow. Such circulating flow includes inflow of the buffering fluid into the cooling zone 22 through a slot passage 28 at an upstream edge of the window 24 and outflow of the bufffering fluid from cooling zone 22 through a slot passage 30 at a downstream edge of the window relative to the direction of the boundary layer flow.

The downstream passage 30 diverts a regulated, ram pressure induced inflow of fluid from the cooling zone 22 of the boundary layer into a cavity chamber 32 formed in the surface 12 and enclosed by housing 34 in underlying relation to the window portion 16. The cavity chamber 32 is depressurized by connection of housing 34 to a source of vacuum through conduit 35. The portion of the boundary layer within cooling zone 22 inwardly diverted through downstream slot passage 30 is thereby isolated from the external boundary layer 18 by the window 24 as it travels along a recirculating flow path in a reversed direction as indicated by arrow 36 in FIG. 2. The circulating flow of fluid through chamber 32 along internally isolated path 36 exits through the upstream slot passage 28 into the cooling zone 22 at the upstream end of window 24 for mixing with the boundary layer 18 during external buffering flow along the heat absorbing flow path 26. The fluid diverted internally for recirculation along the isolated flow path 36 has its absorbed heat extracted by a suitable heat sink device 38 within the cavity chamber 32 as shown. The rate of cooling required to maintain the window 24 within allowable temperature limits under given flight conditions will be dependent upon the selection of an optimum depth distance (H) for the cooling zone 22.

With continued reference to FIG. 2, the buffering fluid being recirculated is supplied with a quanity of a coolant gas from a source 40 to form a buffering mixture with the boundary layer portion 22 as shown for protective coating of the window 24 and to enhance cooling. The source 40 is connected through some control valve 42 to a coolant injection device 44. The coolant injector 44 may be suitably located relative to the recirculating flow path, such as the upstream end of the window 24 as shown in FIG. 2. A minimized inflow quanity of coolant from injector 44 may be controlled through valve 42 to maintain a given window temperature.

FIG. depicts a variation in the geometry of the window portion in the surface 12, in which a window 24' is disposed at some angle $\theta$ to the surface 12 relative to the slot passage 28' at its upstream end to establish the cooling zone 22' having a varying depth with a maximum value $\Delta H$ at the downstream end of the window at which slot passage 30' is formed. The shape of the slot passages 28' and 30', as well as the parameters of the cooling zone 22' determined by $\theta$ and $\Delta H$ thus constitute variables through which an optimum arrangement may be designed in accordance with the present invention for minimizing the cooling necessary to maintain window temperature within allowed limits. Although the parameters $\theta$ and $\Delta H$ under certain conditions may be made equal to zero, it is contemplated that such dimensional parameters would be greater than zero where there is subsonic flow through the slot passages 28' and 30'.

It will apparent from the foregoing that the interplay of the boundary layer 18, the circulating flow of air diverted therefrom and the other parameters aforementioned will determine the window shielding and cooling effectiveness of the described arrangement.

Numerous modifications and variations of the present invention are possible in light of the foregoing teachings. It is therefore to be understood that within the scope of the appended claims in the invention may be practiced otherwise than as specifically described.

What is claimed is:

1. In combination with an surface exposed to a boundary layer of fluid during travel therethrough at high velocites, a system for cooling a window in the surface during said travel thereof, comprising means mounting the window within a portion of said surface for exposure to the boundary layer, cavity means connected to the surface for establishing a flow path isolated by the window from the boundary layer, flow controlling port means in said window mounting portion of the surface for establishing recirculated flow of the fluid between a buffering portion of said boundary layer along the window and the isolated flow path and heat sink means for extracting heat from the fluid during said recirculated flow thereof along the isolated low path to cool the window by heat exchange with the fluid within the buffering portion of the boundary layer.

2. The system of claim 1 wherein said window mounting portion of the surface is recessed.

3. The system of claim 2 wherein said flow controlling port means includes slot passages downstream and upstream of the window through which the fluid is diverted under ram pressure from the buffering portion of the boundary layer to the isolated flow path.

4. The system of claim 1 wherein said flow controlling port means include slot passages downstream and upstream of the window through which the fluid is diverted under ram pressure from the buffering portion of the boundary layer to the isolated flow path.

5. In combination with an surface exposed to a boundary layer of fluid during travel therethrough at high velocities, a system for cooling a window in the surface during said travel thereof, comprising means forming a cooling zone within the boundary layer to which the window is exposed, means mounted in underlying relation to the window for establishing a flow path isolated by the window from the boundary layer, flow controlling port means in the surface for recirculating flow of the fluid between said cooling zone and the isolated flow path and means for extracting heat from the fluid during said recirculated flow thereof along the isolated flow path to cool the window by heat exchange within the cooling zone.

6. The system of claim 5 wherein said flow controlling port means includes passage means in the surface for regulating inflow and outflow of the fluid with respect to said isolated flow path.

7. In combination with a flight vehicle surface having an internal cavity formed therein through which boundary layer air is diverted from the surface, a method of cooling a window mounted in said surface, including the steps of: fixedly positioning the window within the surface overlying said internal cavity; restrictively limiting said diversion of the boundary layer air relative to the internal cavity at location upstream and downstream of the window in the direction of flow of said boundary layer; and cooling the diverted air during flow through the internal cavity isolated from the surface, whereby the cooled air mixes with the boundary layer air externally of the surface in response to outflow thereof from the internal cavity to cool the window.

8. The method of claim 7 including the step of: injecting coolant into the diverted air to form a buffering fluid mixture therewith to protectively coat the window and enhance said cooling of the diverted air.

* * * * *

UNITED STATES PATENT AND TRADEMARK OFFICE
CERTIFICATE OF CORRECTION

PATENT NO. : 5,014,923

DATED : May 14, 1991

INVENTOR(S): Jeffrey C. Robertson

It is certified that error appears in the above-identified patent and that said Letters Patent is hereby corrected as shown below:

The attached drawing Sheets 1-4 (presenting Figs. 1-8) and the attached specification and claims (presenting Claims 1-8) of this patent should be substituted for the incorrectly printed drawing sheet, specification, and claims relating to a different patent.

Signed and Sealed this

Thirteenth Day of July, 1993

Attest:

MICHAEL K. KIRK

Attesting Officer

Acting Commissioner of Patents and Trademarks

WEB-SPOOL FOR A CARTRIDGE

BACKGROUND OF THE INVENTION

1. Field of the Invention

The present invention relates generally to spools, and more particularly to a web-spool for a cartridge or the like.

2. Description of the Prior Art

It is known in the minilab printer art to provide long rolls of photographic paper, and in the computer output microfilmer art to provide longe rolls of 16 mm or 105 mm photographic film, each in convenient daylight-loading cartridges. Those cartridges generally comprise a cylindrical core onto which the film or paper is wound to form a web-roll. The web-roll is enclosed within the cartridge and rotatably supported by sidewalls thereof. The cartridge is provided with a web exit slot having opposed surfaces to which a plush or foam material is applied to allow the web to be withdrawn from the cartridge while excluding light from the cartridge interior. Typically, an anti-clockspringing bar to prevent rotatikon of the core during shipment is installed through holes in a cartridge rim surrounding the core end, and through one of a plurality of aligned castellations on the core end.

As a need has developed for greater web widths and longer web lengths, a problem has arisen in which the web-roll within the cartridge dishes or telescopes axially as a result of shock and vibration during shipment of packaged cartridges. When a web-roll dishes or telescopes, portions of the faces of the web-roll may rub against the interior side surfaces of the cartridge, resulting in an unacceptably high web withdrawal force. A further problem is breakage of the cartridge, core, or anti-clockspringing bar as a result of the high rotational, inertial forces caused by the longer, wider, and heavier web-rolls.

The aforementioned problems may be solved in part by attaching a pair of flanges to opposite ends of the cartridge core to constrain a roll wound on the core from dishing or telescoping into contact with the interior walls of the cartridge. With such a web-spool, the anti-clockspringing mechanism can be mounted on the cartridge, as shown in U.S. Pat. No. 4,802,633, to engage the periphery of the flange instead of the cartridge core.

Tape- or film-spools are also well known in the art, as indicated in U.S. Pat. No. 3,438,592 and the above-mentioned U.S. Pat. No. 4,802,633. The film spool comprises three distinct elements, namely, two flanges and a cylindrical core, which are rendered integral by assembly. In U.S. Pat. No. 3,438,592, the core has annular throats into which project circular sectors separated by core notches provided for passage of lugs on the flanges. One disadvantage of that type of film-spool is that is would be extremely difficult to accurately wind the film onto the core prior to mounting the flanges on the core. The slightest axial telescoping movement of the film as it is wound would make it extremely difficult, if not impossible, to attach the flanges onto the ends of the core. That problem is overcome in the present invention by providing radially outwardly extending tapered guide rings facing each other at the ends of the core for initially guiding the web onto the core and to provide clearance between the web edges and the flanges. The clearance accommodates web telescoping so that the flanges can be secured to the core ends without any interference of resistance from the wed edges resulting from any axial telescoping of the roll that occurs during winding.

SUMMARY OF THE INVENTION

An object of the present invention is to provide an improved web-spool for a cartridge or the like. The web-spool comprises a cylindrical core having at least one outer core lueg radially extending from the core periphery at each end thereof. The core further has one inner core ring radially extending outwardly from the core periphery parallel to the core lug and axially spaced therefrom to form a core groove therebetween. A pair of flanges are attachable to opposite ends of the core. Each flange has a throat extending from the inner surrface thereof toward the outer surface for receiving the core lug and core ring from a complementary core end. Each flange throat further has a radially inwardly extending flange lug and recesses adjacent to each side of the flange lug. The flange lug nests within the core groove, the recesses receive the core lug when a core end is inserted into a flange throat, and the core and flange are rotated relative to one another for securing the flange to the core end.

There are several advantages of the web-spool of this invention. The design of the core and flanges is such as to allow assembly of the flanges of the core after the web is spooled onto the core. Also, the anti-clockspringing mechanism can be mounted on the web-spool cartridge for engagement with a flange periphery rather than at the core. This provides a significant torque advantage which reduces the forces on the plastic core and any possible shipping and handling damage to the cartridge. With this web-spool, the spool bearing diameter can be reduced below the core diameter for reducing the normal core bearing frictional torque, thus reducing the web withdrawal forces.

This invention, and its objects and advantages, will become more apparent from the detailed description of the preferred embodiment presented below.

BRIEF DESCRIPTION OF THE DRAWINGS

In the detailed description of the preferred embodiment of this invention presented below, reference is made to the accompanying drawings, in which.

DESCRIPTION OF THE PREFERRED EMBODIMENT

Because certain parts of web-spools and cartridges are well known, the following description is directed in particular to those elements forming, cooperating directly with, or relating to the present invention. Elements not specifically shown or described herein are selectable from those known in the pertinent art.

Figure 1:
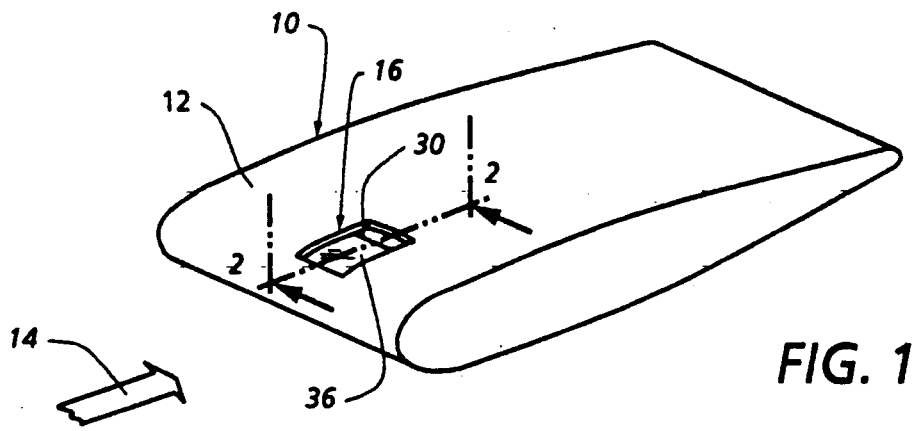
FIG. 1 is a perspective view of a cartridge in which a preferred embodiment of the web-spool of this invention is embodied.
Figure 2:
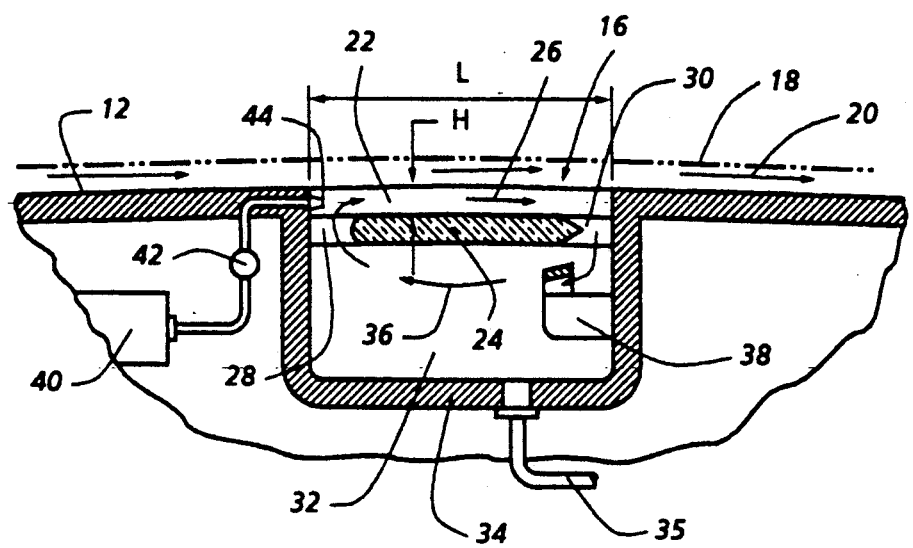
FIG. 2 is a perspective view of the cartridge of FIG. 1 with one housing thereof removed to expose a web wound on a web-spool.

Illustrated in FIGS. 1 and 2 is a cartridge 10 suitable for supplying a computer output microfilmer or the like with a long web 8 of 16 mm- or 105 mm-wide film. The cartridge 10 typically comprises a pair of cartridge housings 12, 14 having sidewalls 16, 18, only two of which are shown in detail, provided with matching semicircular journals 20, 22 for rotatably supporting cylindrical bearings 24 on a pair of identical flanges 26 of a well-roll 32. The cartridge housings 14, 16 are sealed together along mating rims 28, 30 for enclosing the web-roll 32. Housings 12, 14 have nose portions 34, 36 with opposed inner surfaces defining an exit slot 38 through which the web is withdrawn from the cartridge. The opposed inner surfaces normally have a plush or foam material applied thereto, not shown, to prevent light from entering the cartridge interior.

Figure 3:
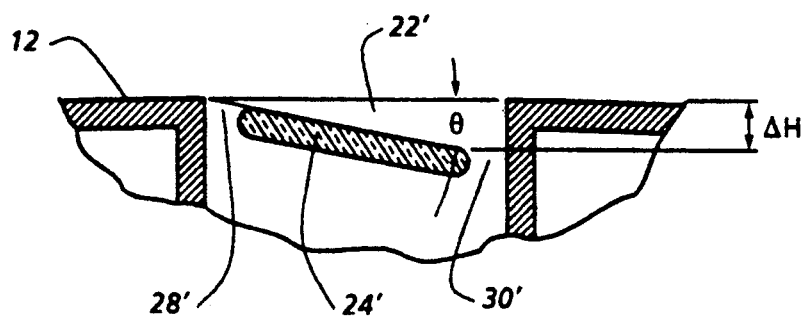
FIG. 3 is a respective view of the web-spool of this invention comprising a core having ends to which flanges are attached.
Figure 1:
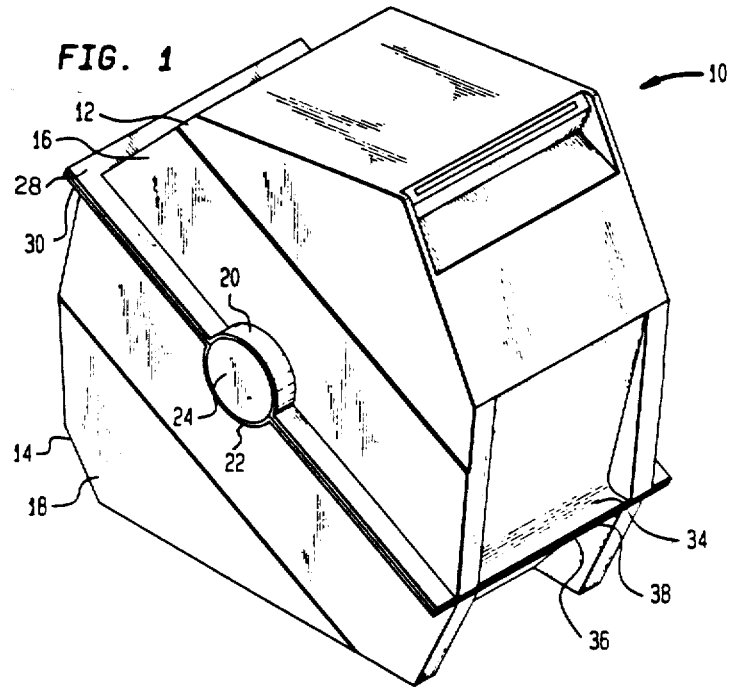
Figure 2:
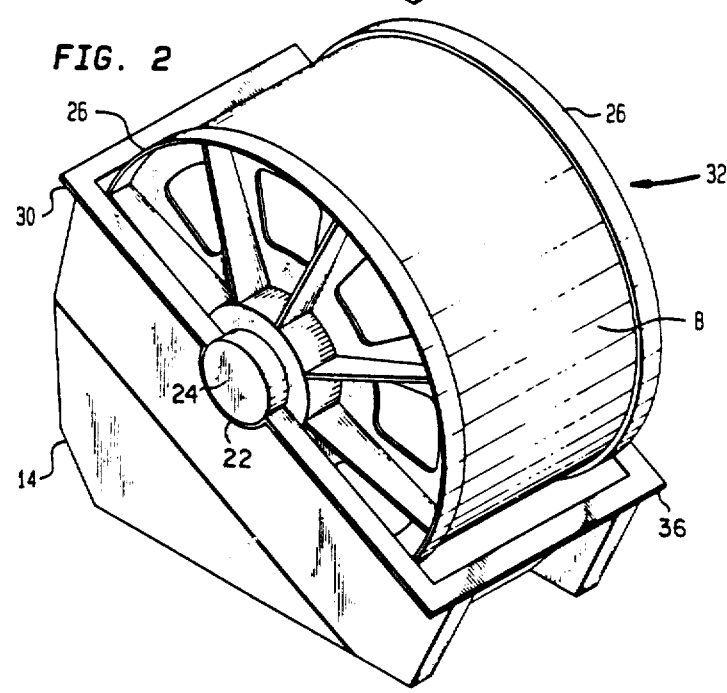
Figure 3:
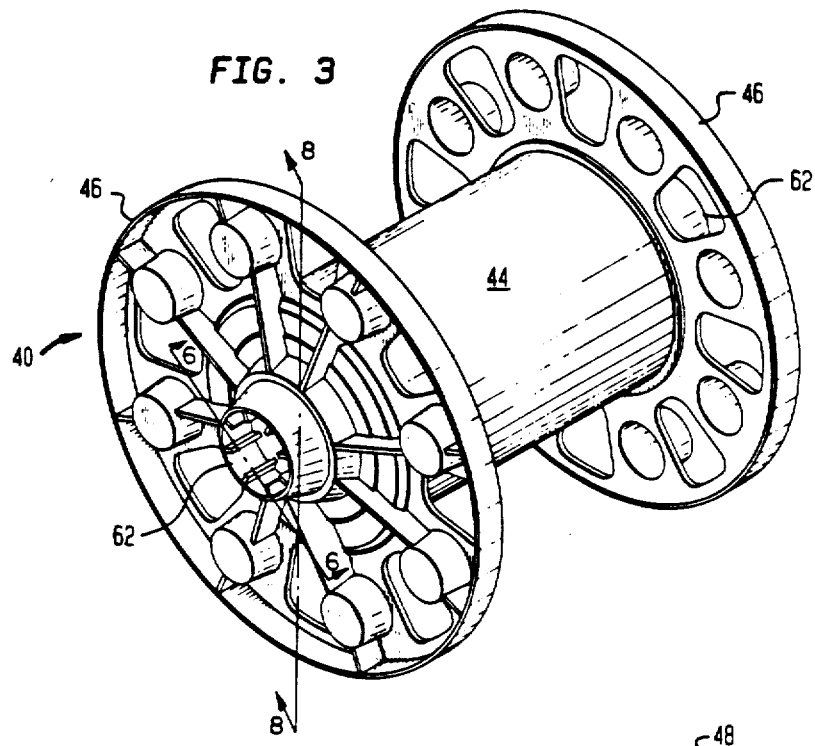
Figure 4:
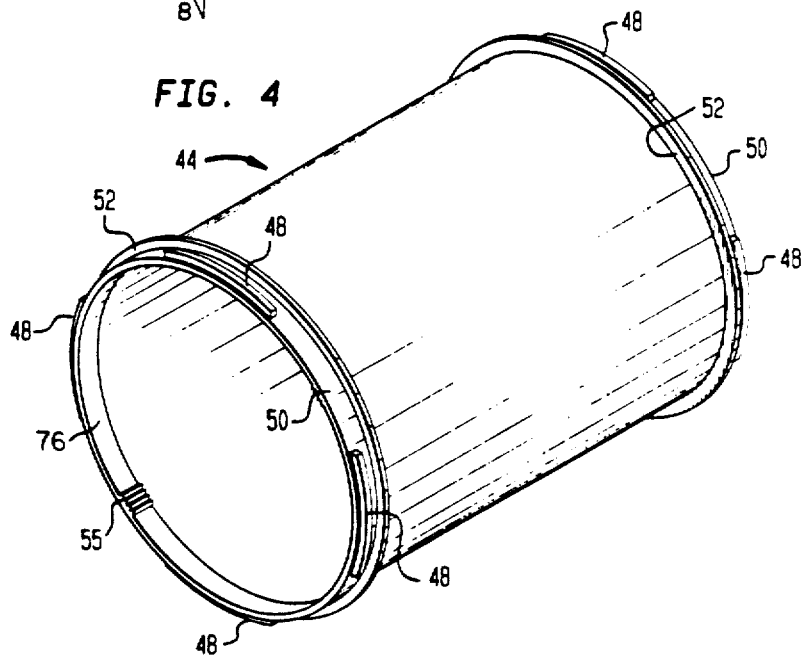
FIG. 4 is an enlarged perspective view of the core.

With reference to FIGS. 3 and 4, a web-roll of the general type illustrated in FIG. 2 comprises a web-spool 40, onto which a long web 42 (FIG. 8) of film or paper is wound. The web-spool 40 comprises a cylindrical core 44, as best seen in FIG. 4, having opposed ends to which a pair of flanges 46, similar to the flanges 26 of FIG. 2, are attached or secured. To manufacture the cartridge, some of the steps involve initially winding the web onto the core 44, attaching the flanges 46 to the core ends to form a web-roll, placing the web-roll in one of the cartridge housings, and securing the other cartridge housing to the one housing for enclosing the web-roll.

Referring to FIGS. 4-8, means for securing the identical pair of flanges 46 to the identical core ends will now be described. Each core end has a plurality of core lugs 48 radially extending outwardly from the periphery thereof. The core lugs 48 are spaced apart, providing notches 50 therebetween. Axially spaced from the core lugs and parallel thereto is an annular core ring 52 radially extending outwardly from the core periphery. A core groove 54 (FIG. 8) is formed between the core lugs 48 and core ring 52. The ring inner surface 56 is tapered to facilitate winding the web 42 on the core 44 with sufficient clearance, in regard to axial web movement during winding, so that the flanges 46 can be attached to the core ends following the winding operation, without any difficulty. The radially outermost peripheral edge 58 of the tapered surface 56 (FIG. 8) lies in the plane B—B of the flange inner surface. The radially innermost edge 60 of the tapered surface 56 merges with the core outer periphery. The axial distance between the outermost peripheral edges 58 of the tapered surfaces 56 on the two flanges 46 is greater than the axial distance between their innermost peripheral edges 60, to allow limited axial movement of the web during winding without impairing attachment of the flanges 46 onto the core ends after the winding operation is completed.

Figure 5:
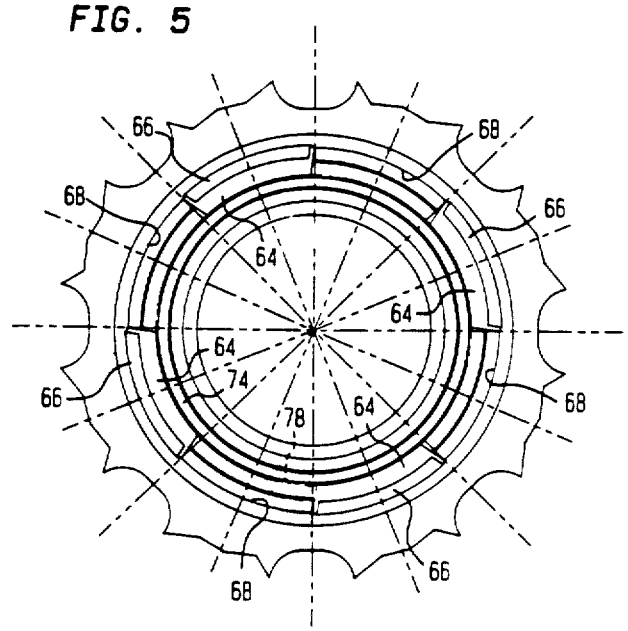
FIG. 5 is a segmented front elevational view of the center portion of the inner surface of the flange.
Figure 8:
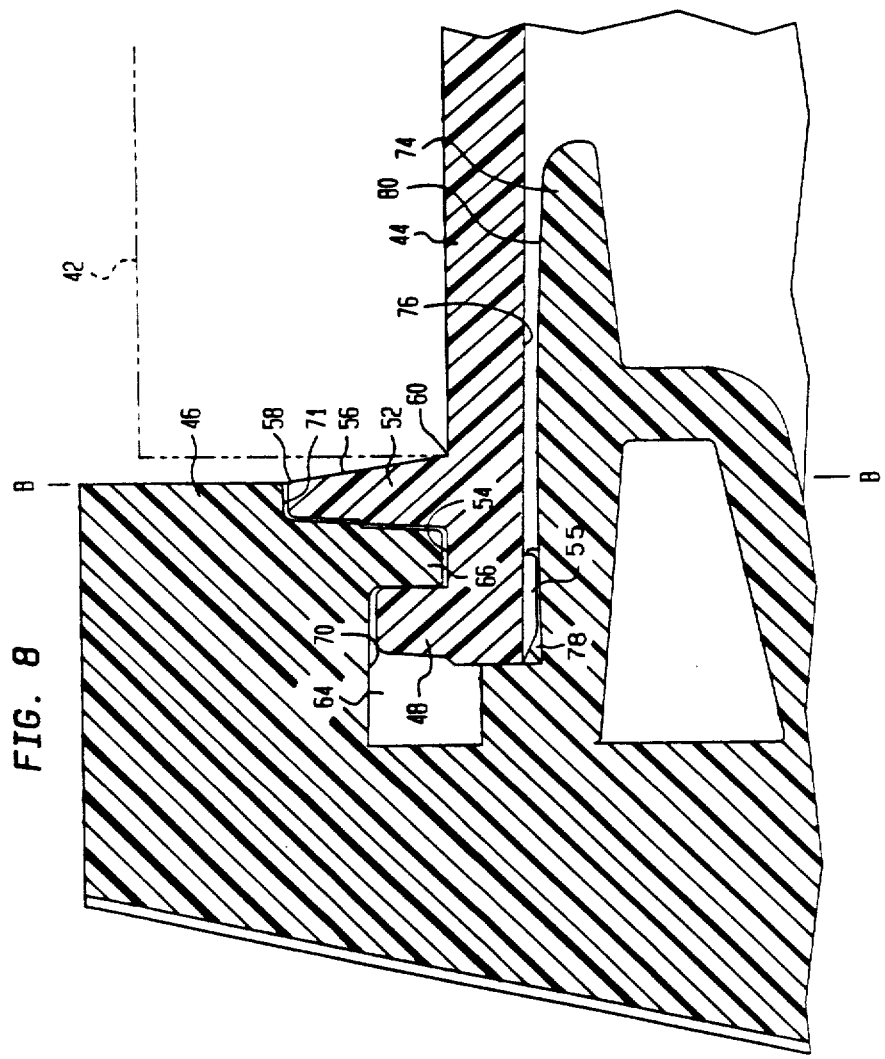
FIG. 8 is an enlarged segmental sectional view take substantially along line 8—8 of FIG. 3.

Each flange 46 (FIG. 3) has an outer surface provided with a cylindrical bearing 62. Each flange 46 further has an annular throat 64 extending from its inner surface toward its outer surface, as best seen in FIGS. 5 and 8.

The throat 64 has a plurality of radially inwardly extending flange lugs 66 spaced apart to form notches 68 therebetween. Recess 70 is provided adjacent to the flange lugs 66.

To secure a flange 46 to a core end, the two are aligned and moved together with the core lugs 48 passing through the flange notches 68 and the flanges lugs 66 passing through the core notches 50 until the ring 52 engages the flange lugs 66 and the flange lugs 66 nest in the core groove 54. Relative rotational movement is imparted to the core 44 and flange 46, causing the core lugs 48 to move behind the flange lugs 66 to prevent axial removal of the flange 46 from the core end. Stop shoulders 72 are provided at one of the ends of the flange lugs 66 (FIG. 7), which are engageable by one of the ends of the core lugs 48 for stopping relative rotational movement of the core and flange when the two are secured together.

To assist in attaching the flanges 46 to the core ends, each flange is provided with an annular guide rim 74 that engages the inner periphery 76 of the core 44 and guides the core lugs 48 into alignment with the flange notches 68 upon rotational adjustment of the core or flange.

Figure 6:
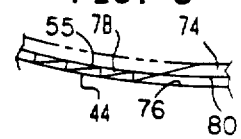
FIG. 6 is an enlarged segmental sectional view taken substantially along line 6—6 of FIG. 3.
Figure 7:
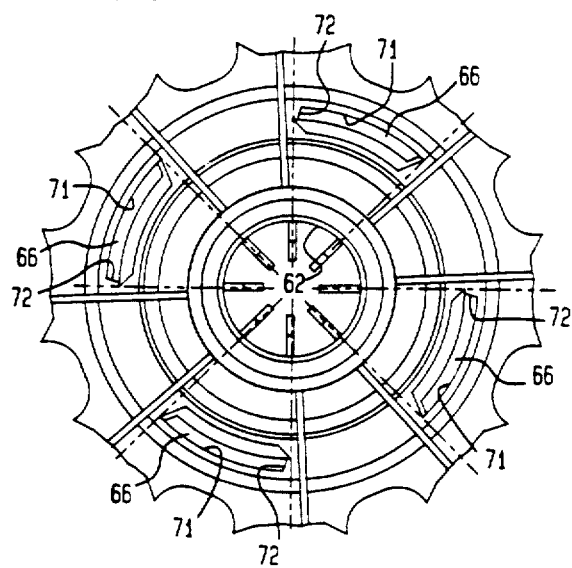
FIG. 7 is a segmental front elevational view of the center portion of the outer surface of the flange.

With reference to FIGS. 4-6 and 8, ratchet teeth 55 on the core and ratchet teeth 78 on the flange are interposed between the core 44 and flange 46 to allow relative rotational movement of the core and flange for securing the two together, but preventing rotational movement in the opposite direction for disassembling the two. Preferably, the teeth 55 are arranged on an inner peripheral surface 76 of the core 44 (FIG. 4) for engaging the complementary teeth 78 on an outer peripheral surface 80 of the guide rim 74. The teeth 55 need not be continuous around the inneer periphery 76 of the core, and preferably are arranged in angular spaced sectors. The teeth are inclined in the proper direction, as best seen in FIG. 6, to allow rotational movement of the flange 46 and core 44 in a direction to secure the two together, but to prevent rotational movement of the flange and core in a direction that would disassemble the two.

To facilitate movement between the core and flange, the core and flange lugs 48 and 66 respectively are provided with rounded or tapered leading and trailing ends.

The invention has been described in detail with particular reference to a preferred embodiment thereof, but it will be understood that variations and modifications can be effected within the spirit and scope of the invention.

I claim:

1. A web-spool comprising: a cylindrical core having an outer peripheral surface onto which a web is wound, the core having at each end thereof at least one core lug and a core ring extending radially outwardly away from the peripheral surface and substantially perpendicular thereto in parallel, axially spaced relation to each other, to form a peripheral core groove therebetween at each core end; and a flange releasably secured to each core end, each flange having axially inner and outer surfaces with a throat extending from its inner surface toward its outer surface for receiving therein said at least one core lug and said core ring, each flange throat further having at least one radially inwardly extending flange lug with recesses adjacent to opposite sides thereof, said at least one flange lug being adapted to nest within said peripheral core groove, and said recesses being adapted to receive said at least one core lug and core ring, when said core end is inserted into said flange throat and said core and said flange are then rotated relative to each other, so that said at least one core lug lockingly engages said at least one flange lug to releasably secure said core end and said flange together.

2. A web-spool as claimed in claim 1 wherein each core ring has an inner tapered surface, so that said tapered surface on said core ring at one core end faces said tapered surface on said core ring at the other core end; wherein said inner surface on each flange lies substantially in a plane, and said tapered surface on each core ring has a radially outermost peripheral edge adapted to lie substantially in said plane; wherein said tapered surface on each core ring has a radially innermost peripheral edge that merges with said core periphery; and wherein the distance between said outermost peripheral edge of said tapered surface on said core ring at said one core end and said outermost peripheral edge of said tapered surface on said core ring at said other core end is greater than the distance between said innermost peripheral edge of said tapered surface on said core ring at said one core end and said innermost peripheral edge of said tapered surface on said core ring at said other core end.

3. A web-spool as claimed in claim 2 wherein complementary ratchet teeth are provided on opposed surfaces of said core end and said flange, to allow rotational movement of said core and said flange in a direction securing them together, but to prevent rotational movement of said core and said flange in an opposite direction that would disassemble them.

4. A web-spool as claimed in claim 3 wherein said complementary ratched teeth comprise first and second sets of teeth of said opposed surfaces of said core end and said flange respectively.

5. A web-spool as claimed in claim 4 wherein said core end has an inner peripheral surface; wherein said flange has a guide rim with an outer peripheral surface for guiding said core end into said flange throat; wherein said first set of teeth is on said core end inner peripheral surface; and wherein said second set of teeth is on said guide rim outer peripheral surface.

6. A web-spool as claimed in claim 1 wherein complementary ratchet teeth are provided on opposed surfaces of said core end and said flange, to allow rotational movement of said core and said flange in a direction securing them together, but to prevent rotational movement of said core and said flange in an opposite direction that would disassemble them.

7. A web-spool as claimed in claim 6 wherein said complementary ratchet teeth comprise first and second sets of teeth on said opposed surfaces of said core end and said flange respectively.

8. A web-spool as claimed in claim 7 wherein said core end has an inner peripheral surface; wherein said flange has a guide rim with an outer peripheral surface for guiding said core end into said flange throat; wherein said first set of teeth is on said core end inner peripheral surface; and wherein said second set of teeth is on said guide rim outer peripheral surface.

* * * * *